William E. Currie Inventor
By ??? Young Attorney

Patented Nov. 1, 1938

2,135,068

UNITED STATES PATENT OFFICE 2,135,068

PRODUCTION OF BLENDED ANTIKNOCK MOTOR FUELS CONTAINING POLYMERIZED GASOLINE

William E. Currie, Flushing, N. Y., assignor to Standard-I. G. Company, a corporation of Delaware Application January 31, 1936, Serial No. 61,721

2 Claims. (Cl. 196—10)

This invention relates to the production of blended motor fuels having high antiknock value and containing both polymerized and hydrogenated gasoline with or without cracked gasoline or absorption gasoline. A particular object of the invention is to supplement the antiknock value of hydrogenated gasoline by blending with it polymerized gasoline (with or without hydrogenation), so that the hydrogenation process may be run at lower temperature than would otherwise be required.

A further object is to utilize the methane of the gas from which the olefins have been removed in the polymerization step, as the source of the hydrogen for the hydrogenation operation and to forward residual gases to a cracking stage for production of further quantities of olefins and methane. Further objects and advantages of the invention will appear from the following description read in connection with the accompanying drawing, in which Fig. 1 is a diagrammatic sketch showing the arrangement of equipment; and Fig. 2 is a sketch showing an alternative form of the absorption and polymerization units.

Figure 1:
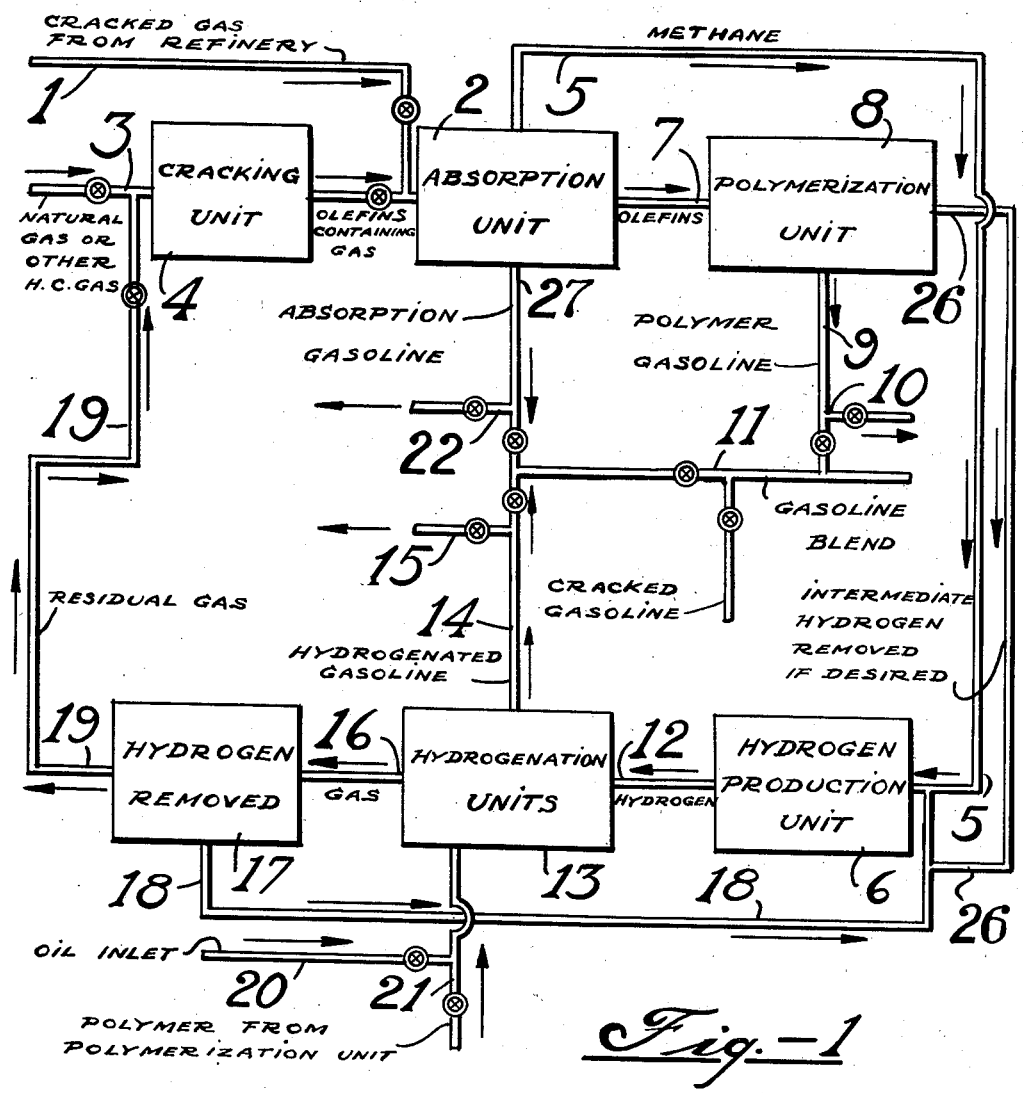
Figure 2:
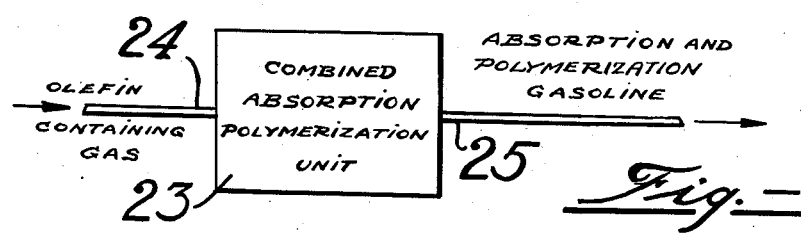

Referring first to Fig. 1, cracked gas from a refinery is passed through a line 1 into an absorption unit 2 or other suitable means for separating methane from olefins. The cracked gas may be supplemented or replaced by natural gas introduced through line 3 and cracked in cracking unit 4 to produce an olefin containing gas.

From the absorption unit the methane is passed through a line 5 into a hydrogen production unit 6. Olefins from the absorption unit flow through a line 7 into a polymerization unit 8 from which the polymerized gasoline is withdrawn through a line 9 and then separated via line 10 or run into the blending line 11.

In the hydrogen production unit 6 the methane is converted by reaction with steam into hydrogen which is passed through line 12 into the hydrogenation unit or units 13. The hydrogenated gasoline is run out through line 14 and withdrawn through line 15 or passed into the blending line 11.

The gas from the hydrogenation step flows through line 16 into the hydrogen removal plant 17 and the hydrogen is recycled through line 18. Residual gas flows through line 19 into cracking unit 4.

In the hydrogenation unit or units oil may be converted or a polymer from the polymerization unit 8 may be hydrogenated. The oil may be run in through line 20 and the polymer through line 21.

If it is desired to remove hydrogen as an intermediate step in the polymerization stage, this hydrogen may be withdrawn through line 26 and used to supplement the hydrogen produced in the unit 6. If it is desired to blend the absorption gasoline with the other products produced in the system, it may be withdrawn through line 27 and run into blending line 11 or withdrawn through line 22.

Referring to Fig. 2, a combined absorption and polymerization unit 23 is provided in which the olefins are absorbed in the presence of the absorption oil under the influence of boron fluoride or other suitable catalyst. The absorption gasoline and the polymerization gasoline are removed together from the absorption oil. In Fig. 2, line 24 is indicated for introducing the olefin containing gas and line 25 for a withdrawal of the absorption and polymerization gasoline. Otherwise the equipment illustrated in Fig. 1 may be used in whole or in part in connection with the combined absorption and polymerization.

In the foregoing description no attempt has been made to give the details of the various units since they may be of any approved kind.

I claim:

1. A method of producing high anti-knock motor fuel from saturated normally gaseous hydrocarbons which comprises subjecting said saturated normally gaseous hydrocarbons to cracking conditions for a time adequate to convert a substantial portion of said saturated hydrocarbons into olefins, thereafter separating the olefins so formed from unreacted saturated hydrocarbons, producing hydrogen from said unreacted saturated hydrocarbons, subjecting the olefins so separated from said unreacted saturated hydrocarbons to polymerization conditions for a time sufficient to convert the normally gaseous olefins into higher-boiling normally liquid polymer hydrocarbons, passing a mixture of said polymer hydrocarbons and hydrogen obtained from said unreacted saturated hydrocarbons through a hydrogenating zone maintained under hydrogenating conditions for a time sufficient to effect a substantial hydrogenation of said polymer hydrocarbons, thereafter fractionating the hydrogenated product to separate a fraction within the motor fuel boiling range and a normally gaseous fraction, removing unreacted hydrogen from said normally gaseous fraction and passing the remainder of said normally gaseous fraction to said first-named cracking treatment.

2. A method of producing high anti-knock stable gasoline motor fuel from saturated normally gaseous hydrocarbons containing methane, which comprises subjecting said normally gaseous hydrocarbons to cracking temperature for a period sufficient to convert a substantial portion of said saturated constituents into olefins, thereafter separating olefins so formed from methane and other unconverted saturated hydrocarbons, subjecting the methane and saturated hydrocarbons so separated to the action of steam to form hydrogen, subjecting the olefins so separated to polymerizing conditions for a time adequate to form a substantial quantity of the high-boiling liquid polymers, combining the polymers so formed with hydrogen produced from said methane and saturated hydrocarbons, passing the mixture to a hydrogenating unit maintained under hydrogenating conditions of temperature and pressure to effect substantial hydrogenation of said polymers and fractionating the hydrogenated product to separate a motor fuel fraction therefrom.

WILLIAM E. CURRIE.